United States Patent [19]

Aoyama

[11] Patent Number: 5,587,856

[45] Date of Patent: Dec. 24, 1996

[54] DISC LOADING MECHANISM INCLUDING A DAMPER MOUNTED IN A BASE PLATE RECESS

[75] Inventor: Takashi Aoyama, Tokyo, Japan

[73] Assignee: Sony Corporation, Tokyo, Japan

[21] Appl. No.: 569,564

[22] Filed: Dec. 8, 1995

Related U.S. Application Data

[63] Continuation of Ser. No. 248,453, May 24, 1994, abandoned.

[30] Foreign Application Priority Data

May 28, 1993 [JP] Japan ................................. 5-126419

[51] Int. Cl.$^6$ ................................................. G11B 17/04
[52] U.S. Cl. ............................... 360/99.02; 360/99.06
[58] Field of Search ........................... 360/9.02, 99.03, 360/99.06, 99.07; 369/75.1, 75.2, 77.1, 77.2

[56] References Cited

U.S. PATENT DOCUMENTS

| | | | |
|---|---|---|---|
| 4,750,065 | 6/1988 | Masaki et al. | 360/99.02 |
| 4,786,998 | 11/1988 | Sugawara et al. | 360/99.06 |
| 4,878,139 | 10/1989 | Hasegawa et al. | 360/99.02 |
| 5,060,096 | 10/1991 | Hirose et al. | 360/99.06 |
| 5,119,252 | 6/1992 | Kamata et al. | 360/99.06 |
| 5,119,358 | 6/1992 | Soga | 369/77.2 |
| 5,123,004 | 6/1992 | Arai | 360/99.06 |
| 5,126,899 | 6/1992 | Kanazawa | 360/99.07 |
| 5,144,508 | 9/1992 | Noda et al. | 360/99.02 |
| 5,146,447 | 9/1992 | Nagasato et al. | 360/99.06 |
| 5,195,079 | 3/1993 | Inoue | 360/99.06 |
| 5,297,117 | 3/1994 | Uzuki et al. | 369/75.2 |

FOREIGN PATENT DOCUMENTS 2237921  5/1991  United Kingdom .

*Primary Examiner*—Jefferson Evans
*Attorney, Agent, or Firm*—Jay H. Maioli

[57] ABSTRACT

A disk loading mechanism includes disk cartridge positioning pins integrally formed in the base of a chassis portion thereof. In addition, at one side of the base of the chassis, a hooked portion is provided for securing a printed ciruit board to a lower side of the chassis. In addition, the base plate of the chassis mounts a damper fox smoothly controlling slider movement in a recess such that an overall height of the unit is reduced. According to such construction, reliable operation is assured with a reduced number of parts, such that manufacturing complexity and costs can be significantly reduced.

9 Claims, 5 Drawing Sheets

DISC LOADING MECHANISM INCLUDING A DAMPER MOUNTED IN A BASE PLATE RECESS

This is a continuation of application Ser. No. 08/248,453 filed May 24, 1994, now abandoned.

BACKGROUND OF THE INVENTION

1. Field of the Invention

The present invention relates generally to a loading mechanism for a data disk. Particularly, the invention relates to a disk loading mechanism which may be manufactured at low cost due to a simplified design and reduced number of parts.

2. Description of the Related Art

Floppy disks, optical disks, and other types of disk type data formats have become increasingly popular in homes and offices, being used for computers, word processors and other types of devices. Thus disk drives for reading and writing to such disks are a neccesary part of any environment utilizing such devices. One essential component of any disk drive is the disk loading mechanism, which allows the disk to be easily loaded into and ejected from the disk drive.

One such conventional disk loading mechanism is shown in FIGS. 5 and 6. Referring to the drawings, it may be seen that such a mechanism comprises a chassis 1 mounting a spindle motor 2 at a central lower side thereof. The spindle motor 2 is utilized to rotate a disk 3 for effecting disk reading and writing operations. The chassis 1 includes a central space for admitting the disk 3, which is usually loaded from an open front side of the disk drive (not shown). At a right side of a base plate 1a of the chassis 1, an L-shaped support wall 4 is formed with a opening 4a formed therethrough in the forward direction of the loading mechanism. The support wall 4 is positioned at a predetermined distance from a shaft 5 which is projected from the base plate 1a surface of the chassis 1. Also, at left and right forward areas of the chassis 1, first spring retaining projections 6, 6 are formed. Spaced along inner side walls 13, 13 of the chassis 1, vertically oriented inner grooves 7 are provided (in the drawing, only two grooves along the left side wall 13 are visible).

At left and right sides of both front and rear areas of the base plate 1a of the chassis 1, two pairs of disk positioning members 8, 8 and 9, 9 are disposed. The disk positioning members are mounted with a predetermined distance therebetween from right to left, and as seen in FIG. 6, the top sides of the rearmost disk positioning members 9, 9 are formed with circular cartridge position determining portions 9a, 9a thereon.

As best seen in FIG. 5, the conventional mechanism includes a slider plate 10 having an upturned C-shaped cross section. An eject button 11 is disposed on a tab 10a provided at a right front side of the slider plate 10. When the slider plate 10 is set into the chassis 1 as shown in FIG. 5, the spindle motor 2 is accommodated by a central U-shaped cut-out 12a, while a first pair of elongate grooves 12b, 12b admit the first spring retaining openings 6, 6. The slider plate 10 thus rests on the base plate 1a of the chassis 1 so as to be freely slidable thereon. The disk positioning members 8, 8, and 9, 9, engage second and third pairs of elongate grooves 14, 14 and 15, 15 for maintaining positioning between the chassis 1 and the slider plate 10 during sliding operation. In addition, projected from the base 12 of the slider plate 10 at a right rear side of the U-shaped cut-out 12a, a lock hook 17 is installed. Also, to the rear of each of the first elongate grooves 12b, 12b of the base 12 of tile slider plate 10, second spring retaining openings 16, 16 are formed. The second spring retaining openings 16, 16 respectively work in conjunction with the first spring retaining projections 6, 6 for mounting coil springs 20, 20 therebetween. The side walls 13, 13 of the slider plate 10 have four cam grooves 18 . . . 18 formed therein and, to the rear of the rearmost of the left side cam groove 18, a rack 19 is provided.

Referring to FIG. 6, a trigger arm 21 is pivotally mounted on the shaft 5 proximate the support wall 4 of the chassis. The trigger arm includes a side portion 21a and an end portion 21b as well as a projection 22 projecting upwardly from the surface of the trigger arm 21. The projection 22 is formed with a spring retaining opening 22a thereon. Pivotal movement of the trigger arm is determined by a torsion spring 5a disposed around the shaft 5. The ends of the torsion spring 5 are respectively attacted to the spring retaining opening 22a and the support wall 4.

Numeral 24 indicates a stepping motor for control of a head carriage 27. The stepping motor 24 is affixed to a rear side of the chassis 1 as seen in FIG. 5. An output shaft 25 of the stepping motor 24 is supported in the opening 4a of the support wall 4 and a V-shaped lead screw 25a is movable along the output shaft 25 according to a rotation thereof. A guide shaft 26 is provided extending in the front/rear direction of the mechanism, one end off the guide shaft 26 is attached to a rear side of the chassis 1 and guides movement of the head carriage 27 while the other end thereof is received in a support opening of a bush (not shown).

As may be seen, the head carriage 27 includes a needle pin 28 engaging the thread of the lead screw 25a of the output shaft 25, contact under pressure being maintained by a spring 29. Thus the head carriage 27 is supported so as to be freely moveable above the chassis 1.

At a forward side of the head carriage 27, a first disk read/write head 30 is supported. Opposed to the first disk read/write head 30, a second disk read/write head 31 is mounted. The heads 30, 31 are mounted on a head arm 32 supported by a flexible spring plate 33 so as to be swingably movable. Swinging movement of the head arm 32 is biased by a torsion spring 34. A stopper 32a projected from the side of the head arm 32 and integrally formed therewith is active to limit pivotal movement of the head arm 32.

Above the slider plate 10, a cartridge holder 36 is movably mounted. Rollers 37 of the cartridge holder 36 are rotatably supported between the cam grooves 18 of the slider plate 10 and the vertical grooves 7 of the chassis 1. Along one side of the cartridge holder 36, a cutout 38 is provided for forming a spring retaining projection 38a. The projection 22 of the trigger arm 21 is moved according to pressure from the insertion of the disk cartridge 3 into the loading mechanism such that the lock hook 17 contacts the side portion 21a of the trigger arm 21. Then, the slider plate 10 is brought adjacent to the base plate 1a dependent on forward motion of the slider plate 10. On the other hand, when the eject button 11 is pressed, the slider plate is urged to move rearwardly, causing the slider plate 10 to be separated from the base plate 1a.

A shutter opening/closing arm 39 is pivotally mounted on one side of the cartridge holder 36 for acting on a shutter 3a of the disk cartridge 3 for effecting opening or closing of the shutter 3a according to a loading or unloading operation of the disk loading mechanism respectively. The upper side of the shutter opening/closing arm 39 is integrally formed with a spring retaining projection 40. A coil spring 41 is held between the spring retaining projection 40 and the spring retaining projection 38a for biasing movement of the shutter opening/closing arm 39.

Further provided in such a conventional disk loading mechanism are a disk type (2DD, 2HD, 2ED) detecting switch 42 and a disk write protect mode detecting switch 43, which are connected to a printed circuit (not shown) provided on a circuit substrate 44 mounted at a lower portion of the chassis 1. Also, at a rear left portion of the chassis 1 a gear damper 45 is provided including a gear 46 engaged with the rack 19 of the slider plate 10 for smoothly controlling a loading and/of unloading operation.

Finally, the case 3b of the disk cartridge is provided with indentations 47 and 48 for engaging with the projecting disk positioning members 9, 9 mounted on the chassis 1 for suitably positioning the disk cartridge 3 for use.

According to the above structure, since two disk positioning members 8, 8 are required for height regulation of tile disk cartridge 3, and another two disk positioning members 9, 9 are utilized for horizontal positioning of the disk cartridge 3, and these members are formed separately from the chassis 1, a number of parts required for assembling a loading mechanism is increased and the cost and complexity of the mechanism is raised.

Thus, it has been required to provide a disk loading mechanism in which a number of parts and a cost of manufacture can be reduced.

SUMMARY OF THE INVENTION

It is therefore a principal object of the present invention to overcome the drawbacks of the related art.

It is a further object of the present invention to provide a disk loading mechanism which may be manufactured at low cost and which utilizes fewer parts.

In order to accomplish the aforementioned and other objects, a disk loading mechanism is provided, comprising:

a chassis with opposing side plates and a base plate having positioning pins formed integrally therewith; a slider for receiving a disc cartridge; a circuit substrate mounted on a plurality of hook portions formed in said side plates; and a recess formed in said base for accommodating a damper mechanism.

DESCRIPTION OF THE PREFERRED EMBODIMENT

Figure 5:
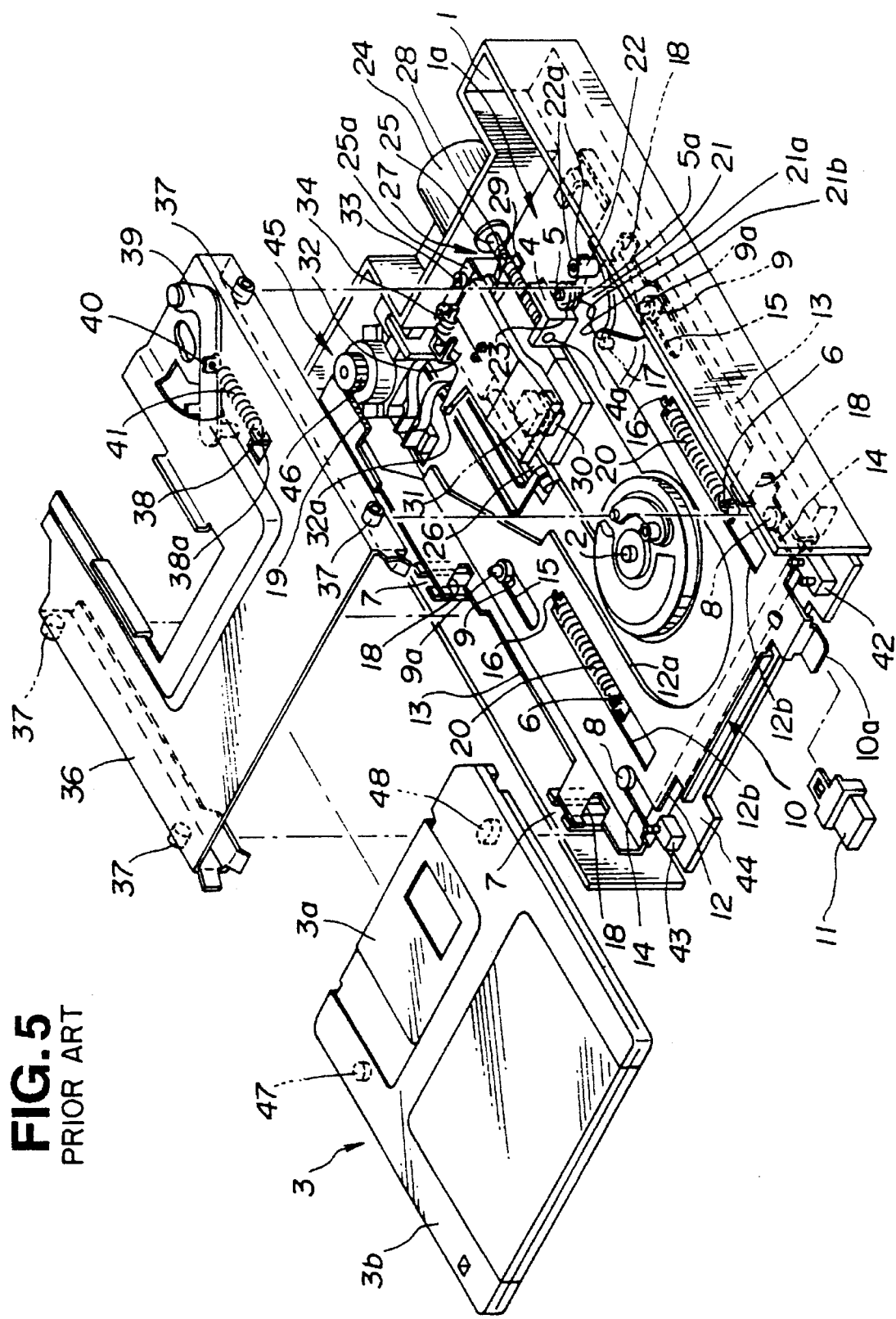
FIG. 5 is a perspective view of a conventional disk loading mechanism.
Figure 6:
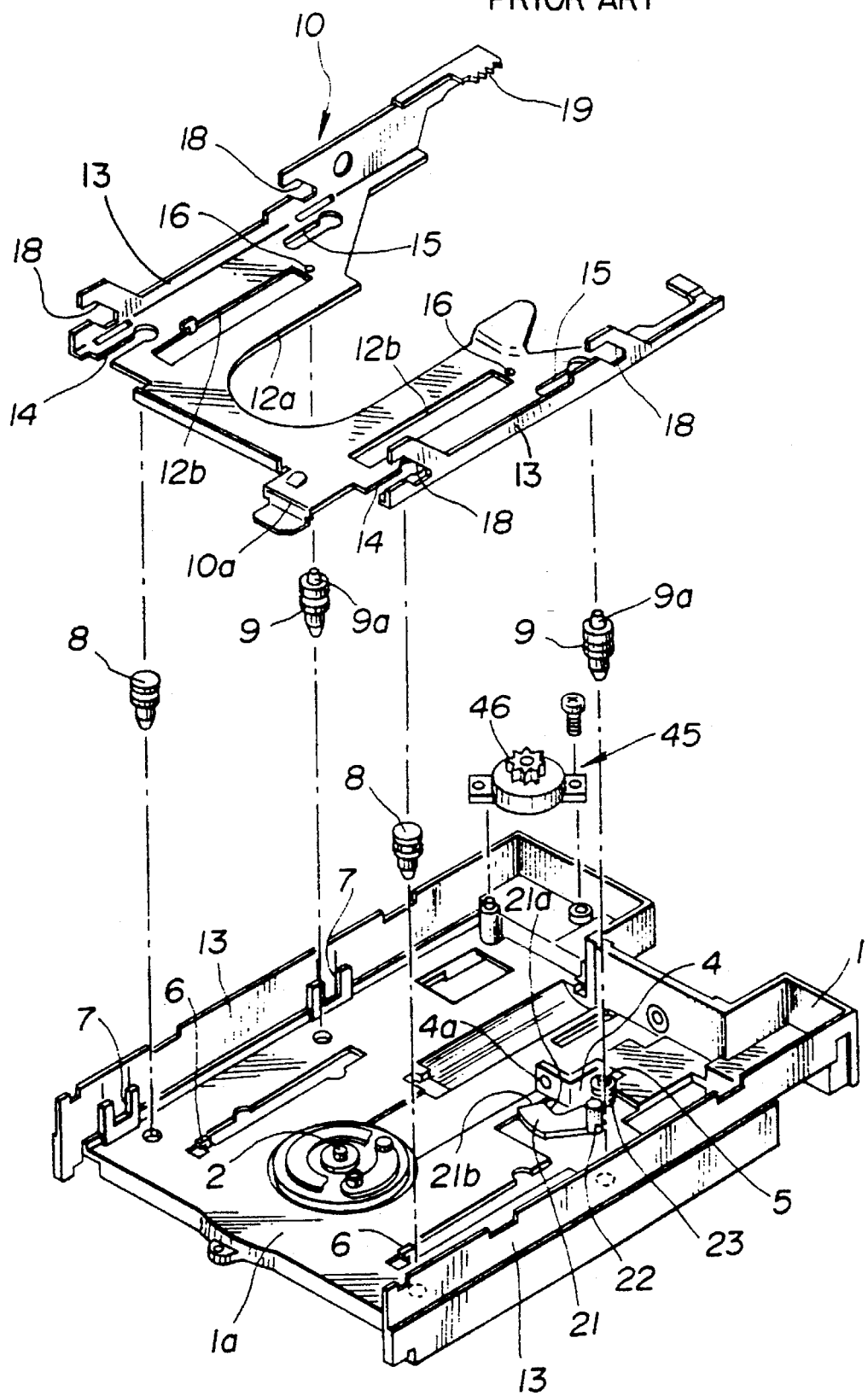
FIG. 6 is a simplified perspective view of a specific portion of the conventional loading mechanism of FIG. 5.

Referring now to the drawings, particularly to FIGS. 1–4, a preferred embodiment of a disk loading mechanism according to the invention will be described hereinbelow in detail. Also, components which are identical with those described in relation to the related art of FIGS. 5 and 6 will be referred to by identical reference numbers and redundant description will be omitted for brevity.

The chassis 60 according to the invention has a central opening 60a receiving an output shaft 61 (see FIG. 3) of a spindle motor (not shown) for effecting rotation of a disk cartridge 3. The chassis 60 comprises side portions 62, 63 which may be formed of metal plate, for example and a base 64 which is preferrably formed of die cast aluminium. The chassis may be installed in a personal computer (not shown) or any other type of device utilizing a disk drive.

The side portions 62, 63 are respectively provided with elongate grooves 65, 66 which regulate front, rear and also upward and downward movement of a slider 80, which will be described in greater detail hereinafter. Each of the elongate grooves 65 and 66 include larger portions 65a, 66a and narrower portions 65b, 66b respectively, giving the elongate grooves a roughly T-shaped aspect. Each of the larger portions 65a, 66a of the elongate grooves 65, 66 include spring retaining hooks 67, 68 formed integrally therewith.

Further, at a forward end of each of the side portions 62, 63, second elongate grooves 69, 70 are provided, also for regulating movement of the slider 80. In addition, at a forward lower edge portion of each of the side portions 62, 63, respectively adjacent the disk type detecting switch 42 and the disk write protect mode detecting switch 43, circuit board retaining members 71 and 72 are provided. Referring to FIG. 4(A), it may be seen that each of the retaining members 71, 72 includes a substrate positioning tab 71a, 72a for securely attaching the circuit board 44 to the lower side of the chassis 60 in a predetermined position. Further to the above, it will also be noted from FIG. 3 that a rear corner retaining portion 73 is provided with a substrate positioning tab 73a formed integrally therewith. Referring to FIG. 4(B), it may be seen that a rear angle portion 74 provided at a rear side of one of the side portions 62, 63 (63 according to the present embodiment) is formed with an L-shaped spacer 75 for determining a horizonal position of the circuit board 44 in relation to the side member 63 and the base 64. At this, it will be noted that the operability and precision of switches such as a disk type detecting switch 42 and a disk write protect mode detecting switch 43, mentioned in connection with the related art, is improved since the positioning of the mounting substrate is assured.

It will further be noted that each of the side portions 62, 63 are provided with vertical grooves 76a, 76b.

On the other hand, according to the present embodiment, the base plate 64 of the chassis 60 is formed of die-cast aluminium. Positioning pins 77, 77 are integrally formed at forward left and right sides of the base plate 64 with a predetermined interval therebetween, while rear positioning pins 78, 78 are integrally formed rearwardly of the positioning pins 77, 77 with a predetermined interval therebetween. The top of the positioning pins 77 are respectively provided with a flat disk positioning surface 77a and the rear positioning pins 78 are respectively formed with projecting semi-circular positioning members 78a. The positioning surfaces 77a and positioning members 78a support a lower portion of a disk cartridge 3 and the positioning members engage recesses 47, 48 formed in the lower side of the disk cartridge 3 when inserted into the disk drive for stably positioning the disk cartridge 3 during use.

The rear left side of the base plate 64 includes a recess 79 which receives a damper 45 associated with a drive gear 46. The damper 45 may be retained by screws or the like.

A C-shaped slider 80 is disposed over the base plate 64 and includes a tab 130 at a front right side thereof for mounting an eject button (not shown). The base surface 82 of the slider 80 includes a C-shaped cut out 82a for accommodating the output shaft 61 of the spindle motor (not shown). The slider 80 further includes side plates 83, 84 set apart by a predetermined interval and allowing the slider 80 to slide freely in forward and rearward directions on the chassis 60.

It will further be noted that the above-mentioned drive gear 46 mounted atop the damper 45 on the base plate 64 engages a rack 85 formed on the inner rear side of the left side plate 83 of the slide 80 to facilitate motion control of the slider 80. A trigger arm lock 86 is formed at a rear right side of the slider 80. In addition, elongate cut-outs 87, 87 and elongate grooves 88, 88 are formed at left and right front and left and right mid portions of the base surface 82 of the slider 80 respectively. The elongate cut-outs 87 and the elongate grooves 88 respectively engage slider posts 131, 131, formed at left and right front sides of the base plate 64 behind and proximate the positioning pins 77, 77, and rear positioning pins 78 for supporting the slider 80 in correct position for allowing sliding operation thereof. It will be noted that each of the elongate cut-outs 87 and grooves 88 are provided with projected rim portions 87a and 88a respectively, although these may be provided on only one side if desired.

Figure 2:
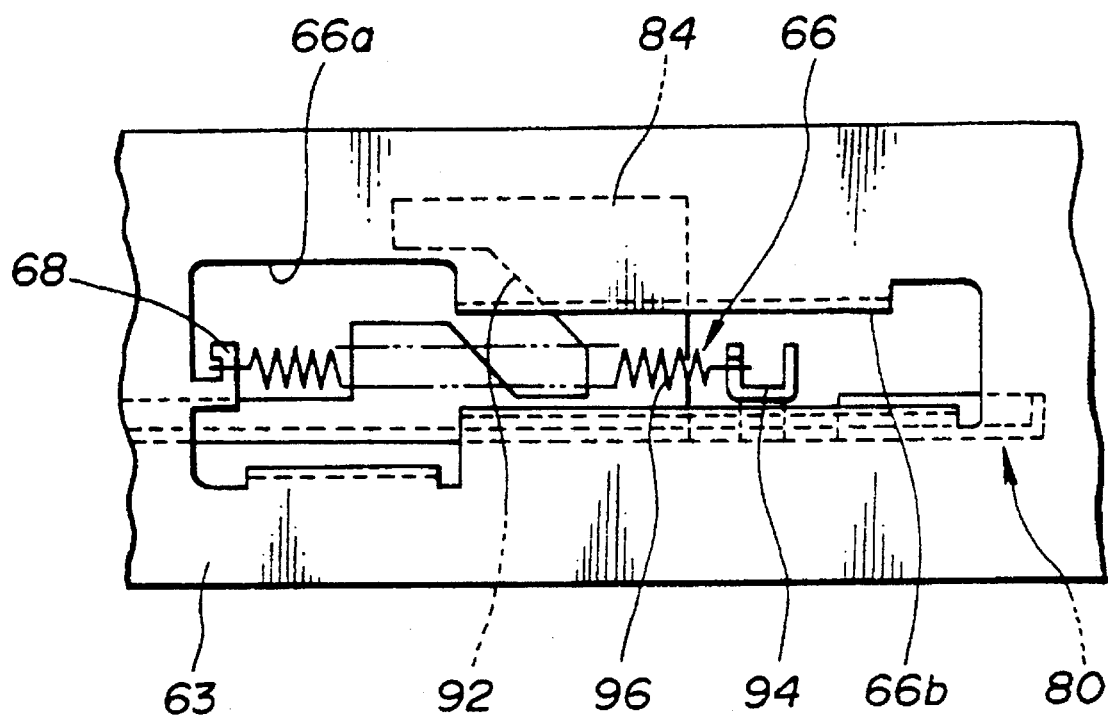
FIG. 2 shows a simplified cross-sectional view of the interaction between movable components of the loading mechanism of the invention.
Figure 3:
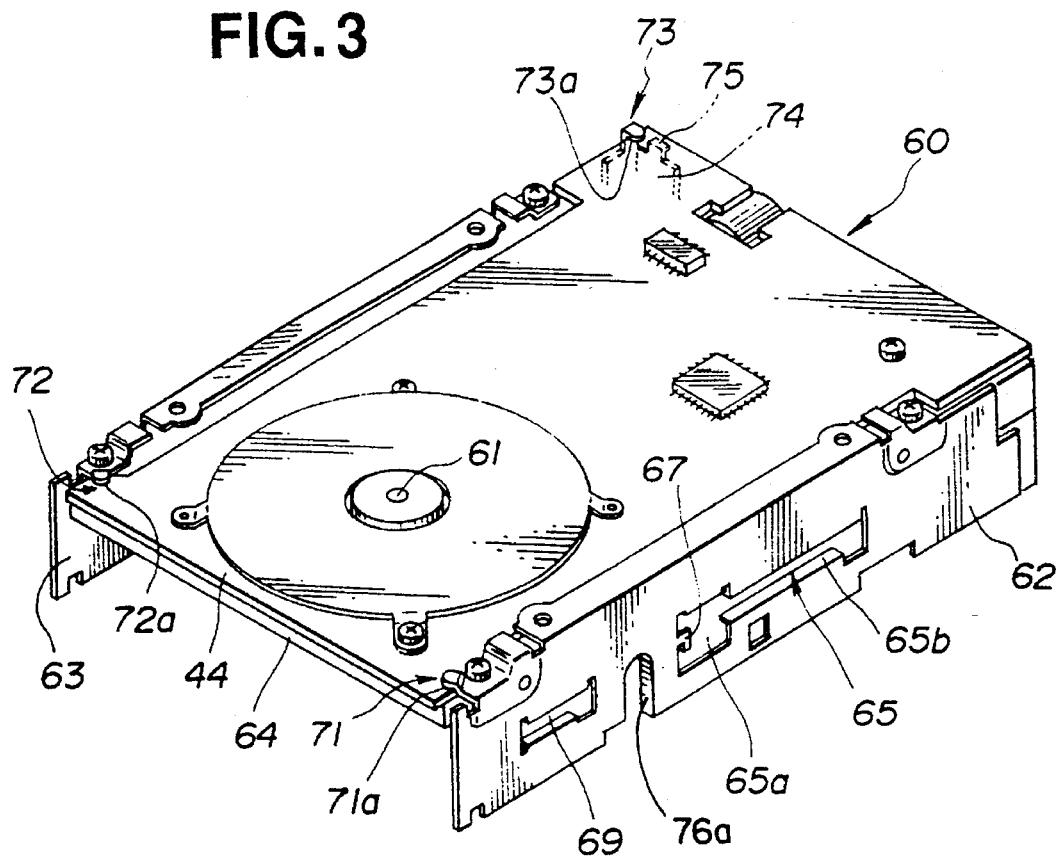
FIG. 3 is an inverted perspective views of a chassis portion of the mechanism of FIG. 1.
Figure 4:
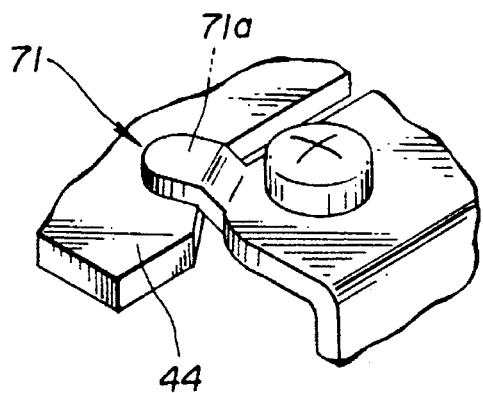
FIGS. 4(A), (B) are perspective view of circuit substrate support portions utilized in the preferred embodiment according to the invention.
Figure 4:
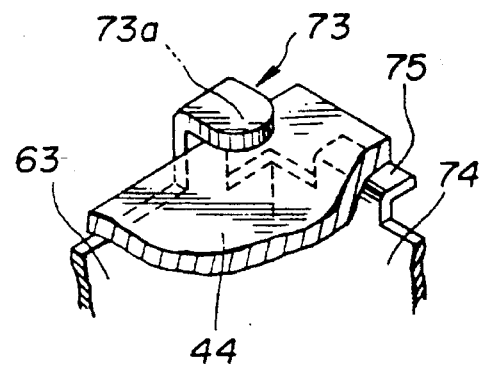

The side plates 83, 84 of the slider 80 have slanted cam grooves 89–92 formed therein. Adjacent the forward cam grooves 89, 90, projections 120, 121 are formed respectively. The projections 120, 121 engage the elongate grooves 69, 70 of the side plates 62, 63 of the chassis 60. Further, as seen in FIG. 2, coil springs 95, 96 are disposed between the spring hooks 67, 68 provided at the front side of the elongate grooves 65, 66 of the side plates 62, 63 and spring hooks 93, 94 located at the rear side of the side plates 83, 84 of the slider 80.

Figure 1:
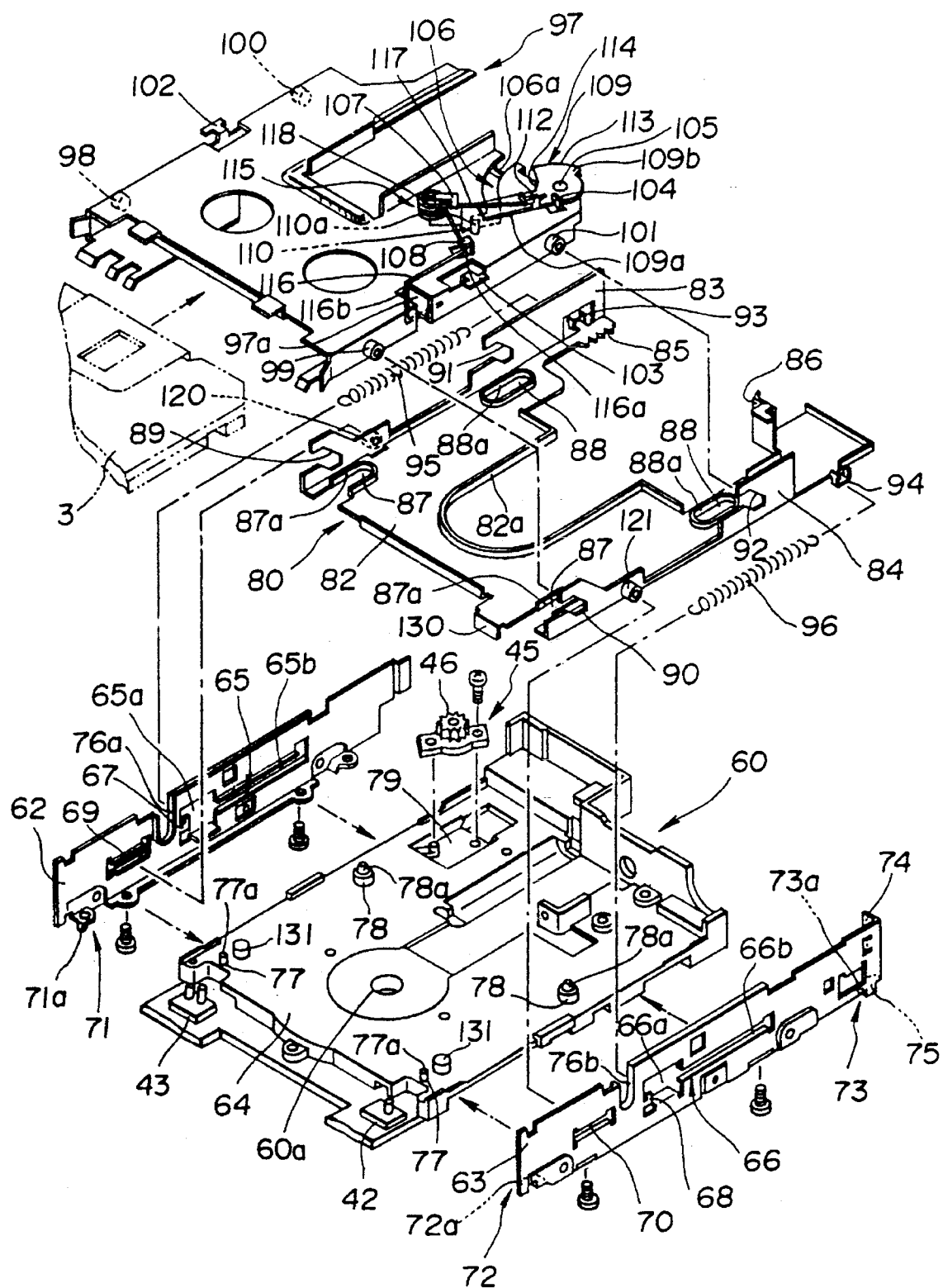
FIG. 1 is a perspective view of a preferred embodiment of a disk loading mechanism according to the invention.

Also referring to FIG. 1, a cartridge holder 97 is provided for slidably supporting the disk cartridge 3 during an insertion and eject operation. At a forward area along one side of the cartridge holder 97, a window 97a is formed. The cartridge holder 97 has projections 98–101 projected from side edges thereof for engaging with the corresponding cam grooves 89–92 of the slider 80. Further, projecting portions 102, 103, respectively projected from a central area of each side of the cartridge holder 97, engage the vertical grooves 76a, 76b of the side plates 62, 63 of the chassis 60. At a rear side of the cartridge holder 97 a regulating arm 104 is integrally formed projected upward from the cartridge holder 97 and set at an angle. The regulating arm 104 regulates rotational movement of a pivot 105 between the arm 104 and the trigger arm lock 86 of the slider 80. An arc shaped groove 106 is formed so as to correspond to the pivotal axis of the pivot 105 and includes an end portion 106a. The leading edge of the groove 106 is adjacent a spring retaining member 107 and proximate a second spring retaining member 108.

An L-shaped trigger arm 109 is disposed about the pivot 105. The trigger arm 109 includes a extending portion 109a, which is movable according to an insertion operation of the disk cartridge 3, and a substantially circular plate portion 109b, which is disposed around the pivot 105. A lower side of a distal end of the extending portion 109a of the trigger arm 109 is provided with a projecting member 110 having a shutter opening/closing member 110a formed on an end thereof which engages a shutter of the disk cartridge 3 through the arc-shaped groove 106 of the cartridge holder 97. An upper side of the extending portion 109a has an upwardly extending spring retaining portion 112 formed thereon, as seen in FIG. 1.

Further, the circular plate portion 109b of the trigger arm 109 includes a mating surface 113 and a stopper 114 which contact the trigger lock 86 for limiting rotational and/or upward movement of the trigger arm 109.

A main coil portion 118 of a torsion spring 115 is held by the spring retaining member 107, disposed such that spring ends 116 and 117 are respectively engaged with the spring retainers 108, 112. The long end 116 of the torsion spring 115 comprises a first portion 116a and a second portion 116b, which are defined by a bend in the long end 116 at the location of the spring retaining member 108. A hooked end of the second portion 116b engages the open window 97a formed at one side of the cartridge holder 97, as best seen in FIG. 1.

According to this construction, when the disk cartridge 3 is loaded into the disk drive, the positioning pins 77, 78 of the chassis 60 accurately position the casing 3b of the cartridge and operational performance is improved.

Further, according to the present embodiment, the chassis has relatively few parts and assembly is simplified while operation may be reliably maintained.

Also, since the rear positioning pins 78 are respectively formed with projecting semi-circular positioning members 78a which lightly contact the elongate grooves 88 of the slider, forward and rearward slider movement is precisely regulated and operability is assured. In addition, since the projections 120, 121 engage the elongate grooves 69, 70 of the side plates 62, 63 of the chassis 60, upward and downward movement of the slider is also precisely regulated.

It will further be noted that the provision of the rear corner retaining portion 73 provided with the substrate positioning tab 73a is effective to secure the printed circuit substrate 44 and movement of the substrate in the height direction of the side plates 62, 63 is prevented.

Since the recess portion 79 is provided for mounting the damper 45, the slider 80 may movably engage the chassis while an overal height dimension of the disk drive may be kept small since the projecting member 110 of the trigger arm 109, having the shutter opening/closing member 110a formed on an end thereof acts with the trigger lock 86 and the stopper 114 such that when the slider 80 moves forward, the cartridge holder 97 is positioned closely adjacent the base surface 82 of the slider 80.

Further to this, when an eject button (not shown) mounted on the tab 130 is pressed and the slider 80 moves rearwardly, the trigger lock 86 and the stopper 114 are active such that the base surface 82 of the slider 80 is separated from contact with the cartridge holder 97.

As set forth above, the disk drive arrangement of the invention, in which disk positioning pins are integrally formed on the chassis is effective in providing a reliable disk loading and unloading operation with a simplified construction and reduced number of parts. At this, manufacturing cost and complexity is significantly reduced.

Also, since the rear angle portion 74 provided at a rear side of one of the side portions 62, 63 is formed with an L-shaped spacer 75 for determining a horizonal position of the circuit board 44 in relation to the side member 62, 63 and the base 64, the positioning of the disk type detecting switch 42 and the disk write protect mode detecting switch 43 at an upper side of the circuit substrate 44 is securely determined such that the operability of the switches is improved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A disk drive apparatus for reading data from and/or writing to a disk contained in a disk cartridge loaded thereon, comprising:
 a chassis including first and second opposing side plates connected by a base plate such that said first and second side plates are supported perpendicular to said base plate in a spaced apart relationship, at least one of said first and second side plates being formed with an elongate horizontal closed slot including a hook at one end thereof;
 disk cartridge positioning means integrally formed on an upper surface of said base plate for positioning said disk cartridge loaded thereon;
 a slider movably supported on said chassis and receivable of said disk cartridge for moving said disk cartridge in upward and downward directions to facilitate engagement between a lower side of said disk cartridge and said disk cartridge positioning means according to a loading/unloading operation of said disk drive, wherein said disk cartridge positioning means guides movement of said slider in forward and rearward directions while permitting movement of said slider in upward and downward directions with respect to said base plate for an entire locus of movement of said slider in the forward and rearward directions, said slider including at least one projection at a side thereof engageable with said slot formed in said one side plate of said chassis for guiding movement of said slider in a horizontal direction and for continuously preventing movement of said slider in the upward and downward directions with respect to said base plate; and
 biasing means disposed in said slot and connected between said projection and said hook in said slot, said biasing means biasing said slider in a direction of extracting said disk cartridge.

2. A disk drive as set forth in claim 1, wherein said disk cartridge positioning means comprises pins projected from said upper surface of said base plate and formed integrally therewith, a maximum diameter of each of said pins being at a point adjacent to said upper surface of said base plate.

3. A disk drive as set forth in claim 2, wherein said pins project through elongate grooves formed in said slider during movement of said slider during operation of said disk drive, the diameter of each of said pins being less than the width of the respective groove along an entire length of said pin.

4. A disk drive as set forth in claim 1, wherein said base plate is made of metal and is formed by die casting.

5. A disk drive as set forth in claim 1, wherein said biasing means comprises a spring.

6. A disk drive as set forth in claim 1, further comprising a circuit substrate supported on said chassis in a predetermined position and wherein at least one of said first and second side plates of said chassis includes circuit substrate height determining means including a corner retaining portion formed in one corner and a plurality of hook portions formed along a periphery of said chassis for retaining said circuit substrate in said predetermined position relative to said chassis, said corner retaining portion including a first tab for abutting a lower surface of said circuit substrate and a second tab for abutting simultaneously an upper side of said circuit substrate for clamping said circuit substrate.

7. A disk drive as set forth in claim 6, further comprising a switch provided on an upper side of said circuit substrate proximate a position whereat said circuit substrate is supported by one of said plurality of hook portions of said circuit substrate height determining means.

8. A disk drive as set forth in claim 1, further comprising:
 a recess formed in said upper surface of said base plate of said chassis; and
 a damper mechanism mounted in said recess so as to be engageable with said slider for smoothly controlling movement of said slider in a manner such that an overall height of said disk drive may be kept small.

9. A disk drive as set forth in claim 8, wherein said damper mechanism comprises a gear rotatably mounted in said recess.

* * * * *